US012785441B2

(12) United States Patent
Ma

(10) Patent No.: US 12,785,441 B2
(45) Date of Patent: Nov. 3, 2026

(54) POWER SUPPLY CONTROL METHOD AND SYSTEM FOR POWER SUPPLY UNIT OF SERVER, DEVICE, AND MEDIUM

(71) Applicant: Suzhou MetaBrain Intelligent Technology Co., Ltd., Suzhou (CN)

(72) Inventor: Wenchao Ma, Suzhou (CN)

(73) Assignee: Suzhou MetaBrain Intelligent Technology Co., Ltd., Suzhou (CN)

( * ) Notice: Subject to any disclaimer, the term of this patent is extended or adjusted under 35 U.S.C. 154(b) by 89 days.

(21) Appl. No.: 18/876,306

(22) PCT Filed: Nov. 28, 2023

(86) PCT No.: PCT/CN2023/134587

§ 371 (c)(1),
(2) Date: Dec. 18, 2024

(87) PCT Pub. No.: WO2024/187820

PCT Pub. Date: Sep. 19, 2024

(65) Prior Publication Data

US 2026/0081462 A1 Mar. 19, 2026

(30) Foreign Application Priority Data

Mar. 10, 2023 (CN) ......................... 202310228061.2

(51) Int. Cl.
*G06F 1/30* (2006.01)
*H02J 13/12* (2026.01)

(52) U.S. Cl.
CPC .............. *H02J 13/12* (2026.01); *G06F 1/305* (2013.01)

(58) Field of Classification Search
CPC ................................ H02J 13/12; G06F 1/305
See application file for complete search history.

(56) References Cited

U.S. PATENT DOCUMENTS 6,262,567 B1 * 7/2001 Bartlett ................... G05F 1/465 323/283
7,065,662 B2 * 6/2006 Chen ......................... G05F 1/56 713/340

(Continued)

FOREIGN PATENT DOCUMENTS

CN 106558882 A 4/2017
CN 208506629 U 2/2019

(Continued)

OTHER PUBLICATIONS

International Search Report cited in PCT/CN2023/134587, mailed Feb. 29, 2024, 5 pages.

(Continued)

*Primary Examiner* — Zahid Choudhury
(74) *Attorney, Agent, or Firm* — Cooper Legal Group, LLC

(57) ABSTRACT

The present application discloses a power supply control method and system for a power supply unit of a server, a device, and a medium. The method includes: determining a target sampling point based on a current scenario, and obtaining a sampled voltage at the target sampling point in a power supply link of the power supply unit according to a preset rule, the target sampling point being a sampling point arranged in the power supply unit, and the preset rule representing a corresponding relationship between the sampled voltage at the target sampling point and an actual voltage; obtaining a voltage error of the power supply link through calculation based on the sampled voltage at the target sampling point; and adjusting a voltage of the power supply link of the power supply unit based on the voltage error of the power supply link.

19 Claims, 7 Drawing Sheets

(56) References Cited

U.S. PATENT DOCUMENTS

| | | | | |
|---|---|---|---|---|
| 7,711,967 | B2 * | 5/2010 | Woo | G06F 1/26<br>340/310.15 |
| 8,484,492 | B2 * | 7/2013 | Yen | G06F 1/26<br>713/340 |
| 10,423,183 | B2 * | 9/2019 | Chen | G05F 1/625 |
| 11,714,480 | B2 * | 8/2023 | Fletcher | G06F 11/3058<br>713/300 |
| 2007/0296386 | A1 | 12/2007 | Umeki | |
| 2008/0010474 | A1 * | 1/2008 | Chapuis | H02M 3/157<br>713/300 |
| 2008/0191789 | A1 * | 8/2008 | Anidjar | H03K 19/0027<br>327/544 |
| 2011/0264936 | A1 * | 10/2011 | Kamp | G06F 1/08<br>713/323 |
| 2011/0313582 | A1 * | 12/2011 | van Megen | G01D 4/00<br>700/297 |
| 2014/0208136 | A1 * | 7/2014 | Rahardjo | G06F 1/00<br>713/320 |
| 2016/0043707 | A1 * | 2/2016 | Bhatia | G11C 7/1093<br>327/276 |
| 2020/0033901 | A1 | 1/2020 | Liu | |
| 2020/0110454 | A1 * | 4/2020 | Yang | H02H 9/004 |
| 2023/0049478 | A1 * | 2/2023 | Liao | G06F 1/26 |
| 2023/0275420 | A1 * | 8/2023 | Blume | H02M 1/0012<br>361/91.1 |
| 2023/0318332 | A1 * | 10/2023 | Patel | G06F 1/263<br>320/134 |
| 2024/0265799 | A1 * | 8/2024 | Xu | G01R 31/36 |

FOREIGN PATENT DOCUMENTS

| | | | |
|---|---|---|---|
| CN | 110726951 | A | 1/2020 |
| CN | 111857315 | A | 10/2020 |
| CN | 113703387 | A | 11/2021 |
| CN | 114499176 | A | 5/2022 |
| CN | 115963912 | A | 4/2023 |

OTHER PUBLICATIONS

Written Opinion cited in PCT/CN2023/134587, mailed Feb. 29, 2024, 9 pages.

First Office Action cited in CN202310228061.2, mailed Apr. 18, 2023, 14 pages.

Notification to Grant Patent Right for Invention cited in CN202310228061.2, mailed May 26, 2023, 3 pages.

* cited by examiner

POWER SUPPLY CONTROL METHOD AND SYSTEM FOR POWER SUPPLY UNIT OF SERVER, DEVICE, AND MEDIUM

CROSS-REFERENCE TO RELATED APPLICATION

This application claims priority to Chinese Patent Application No. 202310228061.2, filed with the China National Intellectual Property Administration on Mar. 10, 2023 and entitled "POWER SUPPLY CONTROL METHOD AND SYSTEM FOR POWER SUPPLY UNIT OF SERVER, DEVICE, AND MEDIUM", which is incorporated herein by reference in its entirety.

FIELD

The present application relates to the field of power supply of power supply units of servers, and in particular, to a power supply control method and system for a power supply unit assembly of a server, a computer device, and a nonvolatile computer-readable storage medium.

BACKGROUND

With the rapid development of Internet technology, information resources have exploded, and as new infrastructure in the Internet era, a data center needs to deal with increasingly heavy data tasks. To deal with increasingly heavy data processing tasks, performance of a server is being continuously optimized. Along with this come increases in system power consumption and a line loss, which pose a severe challenge for stable power supply of a power supply unit (PSU) of the server to a far end of the server.

Currently, power supply architectures of high-power servers mostly use busbars or printed circuit boards (PCBs) plated with copper on large areas for current transmission. Due to long power supply distances, line losses increase, and voltages at far-end power supply points may be low, poor in dynamic response, and the like. As a result, there may be power supply abnormalities in case of sudden pressure changes, and server systems cannot operate normally.

To ensure stable power supply to a far-end component of the system, currently, a far-end voltage is usually monitored at a far-end power supply point. The far-end voltage is monitored to compensate for an output voltage, or a buck-boost circuit is additionally disposed at the far-end power supply point, to stabilize the voltage at the far-end power supply point. However, monitoring the far-end voltage to compensate for the output voltage is difficult to quickly respond to a voltage fluctuation of a component with high dynamics. For a component with a high power requirement, it is also difficult to design a buck-boost circuit.

SUMMARY

The present application provides a power supply control method and system for a power supply unit of a server, a computer device, and a nonvolatile computer-readable storage medium, to ensure stable power supply of a power supply architecture of a high-power server.

The following technical solutions are used in the present application. According to one or more aspect, the present application provides a power supply control method for a power supply unit of a server. The method includes:

- determining a target sampling point based on a current scenario, and obtaining a sampled voltage at the target sampling point in a power supply link of the power supply unit according to a preset rule, the target sampling point being a sampling point arranged in the power supply unit, or being a sampling point arranged close to an output end of a multi-path redundant circuit of the power supply unit, or being a sampling point arranged at a far-end load of a server motherboard, and the preset rule representing a corresponding relationship between the sampled voltage at the target sampling point and an actual voltage;
- obtaining a voltage error of the power supply link through calculation based on the sampled voltage at the target sampling point; and
- adjusting a voltage of the power supply link of the power supply unit based on the voltage error of the power supply link.

In some embodiments, a first differential amplification circuit and a second differential amplification circuit are connected to the power supply link of the power supply unit, the sampling point in the power supply unit is connected to the first differential amplification circuit, and the sampling point close to the output end of the multi-path redundant circuit of the power supply unit and the sampling point arranged at the far-end load of the server motherboard are connected to the second differential amplification circuit.

The obtaining a sampled voltage at a target sampling point in a power supply link of the power supply unit based on a current scenario and a preset rule includes:

- determining the target sampling point based on the current scenario, and obtaining a target sampling point voltage; and
- obtaining a sampled voltage of the first differential amplification circuit or the second differential amplification circuit through calculation according to the preset rule and the target sampling point voltage.

In some embodiments, the current scenario is a scenario in which the power supply unit is powered on normally. The determining the target sampling point based on the current scenario, and obtaining a target sampling point voltage includes:

- obtaining, based on the scenario in which the power supply unit is powered on normally, a voltage at the sampling point arranged in the power supply unit.

The obtaining a sampled voltage of the first differential amplification circuit or the second differential amplification circuit through calculation according to the preset rule and the target sampling point voltage includes:

- obtaining the sampled voltage of the first differential amplification circuit through calculation according to the preset rule and the voltage at the sampling point arranged in the power supply unit.

In some embodiments, the first differential amplification circuit includes a first input end, a second input end, and a first output end, where the first input end and the second input end are connected to the sampling point arranged in the power supply unit, and the first output end outputs a first linearly amplified signal representing the sampled voltage of the first differential amplification circuit.

In some embodiments, the first differential amplification circuit includes a first resistor, a second resistor, a third resistor, a fourth resistor, and a first operational amplifier.

One end of the first resistor is connected as the first input end of the first differential amplification circuit to a sampling point A arranged in the power supply unit. The other end of the first resistor is connected to an in-phase input end of the first operational amplifier and one end of the second resistor.

The other end of the second resistor is connected to an output end of the first operational amplifier.

One end of the third resistor is connected as the second input end of the first differential amplification circuit to a sampling point B arranged in the power supply unit. The other end of the third resistor is connected to an inverting input end of the first operational amplifier and one end of the fourth resistor. The other end of the fourth resistor is grounded.

In some embodiments, the first resistor is equal to the third resistor, and the second resistor is equal to the fourth resistor.

In some embodiments, the current scenario is a scenario of ensuring stable power supply to a far end. The determining the target sampling point based on the current scenario, and obtaining a target sampling point voltage includes:

obtaining, based on the scenario of ensuring stable power supply to the far end, a voltage at the sampling point arranged at the far-end load of the server motherboard.

The obtaining a sampled voltage of the first differential amplification circuit or the second differential amplification circuit through calculation according to the preset rule and the target sampling point voltage includes:

obtaining the sampled voltage of the second differential amplification circuit through calculation according to the preset rule and the voltage at the sampling point arranged at the far-end load of the server motherboard.

In some embodiments, the current scenario is a scenario in which the power supply unit is powered off. The determining the target sampling point based on the current scenario, and obtaining a target sampling point voltage includes:

obtaining, based on the scenario in which the power supply unit is powered off, a voltage at the sampling point arranged in the power supply unit.

The obtaining a sampled point voltage of the first differential amplification circuit or the second differential amplification circuit through calculation according to the preset rule and the target sampling point voltage includes:

obtaining the sampled voltage of the first differential amplification circuit through calculation according to the preset rule and the voltage at the sampling point arranged in the power supply unit.

In some embodiments, the current scenario is a scenario in which a far-end sampling point of a system is abnormal. The determining the target sampling point based on the current scenario, and obtaining a target sampling point voltage includes:

obtaining, based on the scenario in which the far-end sampling point of the system is abnormal, a voltage at the sampling point arranged close to the output end of the multi-path redundant circuit of the power supply unit.

The obtaining a sampled point voltage of the first differential amplification circuit or the second differential amplification circuit through calculation according to the preset rule and the target sampling point voltage includes:

obtaining the sampled voltage of the second differential amplification circuit through calculation according to the preset rule and the voltage at the sampling point arranged close to the output end of the multi-path redundant circuit of the power supply unit.

In some embodiments, the second differential amplification circuit includes a third input end, a fourth input end, a fifth input end, a sixth input end, and a second output end.

The third input end and the fourth input end are connected to the sampling point arranged close to the output end of the multi-path redundant circuit of the power supply unit. The fifth input end and the sixth input end are connected to the sampling point arranged at the far-end load of the server motherboard. The second output end outputs a second linearly amplified signal representing the sampled voltage of the second differential amplification circuit.

In some embodiments, the second differential amplification circuit includes a fifth resistor, a sixth resistor, a seventh resistor, an eighth resistor, a ninth resistor, a tenth resistor, and a second operational amplifier.

One end of the ninth resistor is connected as the third input end of the second differential amplification circuit to a sampling point C arranged close to the output end of the multi-path redundant circuit of the power supply unit. The other end of the ninth resistor is connected to the fifth resistor. One end of the fifth resistor is connected to the other end of the ninth resistor, and is connected as the fifth input end of the second differential amplification circuit to a sampling point E arranged at the far-end load of the server motherboard. The other end of the fifth resistor is connected to an in-phase input end of the second operational amplifier and one end of the seventh resistor. The other end of the seventh resistor is connected to the output end of the second operational amplifier.

One end of the tenth resistor is connected as the fourth input end of the second differential amplification circuit to a sampling point D arranged close to the output end of the multi-path redundant circuit of the power supply unit. The other end of the tenth resistor is connected to the sixth resistor. One end of the sixth resistor is connected to the tenth resistor, and is connected as the sixth input end of the second differential amplification circuit to a sampling point F arranged at the far-end load of the server motherboard. The other end of the sixth resistor is connected to an inverting input end of the second operational amplifier and one end of the eighth resistor. The other end of the eighth resistor is grounded.

In some embodiments, the fifth resistor is equal to the sixth resistor, the ninth resistor is equal to the tenth resistor, and the seventh resistor is equal to the eighth resistor.

In some embodiments, before the obtaining a voltage error of the power supply link through calculation based on the sampled voltage at the target sampling point, the method further includes:

obtaining a specified value of an output voltage of the power supply unit.

The obtaining a voltage error of the power supply link through calculation based on the sampled voltage at the target sampling point includes:

calculating a difference between the specified value of the output voltage of the power supply unit and the sampled voltage at the target sampling point, to obtain the voltage error of the power supply link.

In some embodiments, the adjusting a voltage of the power supply link of the power supply unit based on the voltage error of the power supply link includes:

obtaining a link operating frequency through calculation based on the voltage error of the power supply link; and adjusting the voltage of the power supply link of the power supply unit based on the link operating frequency.

In some embodiments, the obtaining a link operating frequency based on the voltage error of the power supply link includes:

obtaining an output value of a target Pi controller through calculation based on the voltage error of the power supply link; and obtaining the link operating frequency based on a mapping relationship between an output value of a Pi controller and a link operating frequency, and the output value of the target Pi controller. In some embodiments, before the obtaining a sampled voltage at a target sampling point in a power supply link of the power supply unit based on a current scenario and a preset rule, the method further includes:

detecting, in response to receiving a power supply unit power-on instruction or a power supply unit power-off instruction, whether a power status of the power supply unit is normal; and obtaining the sampled voltage at the target sampling point in the power supply link of the power supply unit based on the current scenario and the preset rule in response to detecting that the power status of the power supply unit is normal.

In some embodiments, before the detecting, in response to receiving a power supply unit power-on instruction, whether a power status of the power supply unit is normal, the method further includes:

determining whether statuses of the power supply unit and an associated component of the power supply unit satisfy a preset condition; and detecting, in response to determining that the statuses of the power supply unit and the associated component of the power supply unit satisfy the preset condition, whether the power status of the power supply unit is normal.

In some embodiments, the power supply unit is connected to the server motherboard through the multi-path redundant circuit. The current scenario is a scenario in which the power supply unit is powered on/powered off normally, and the target sampling point is the sampling point arranged in the power supply unit; the current scenario is a scenario of ensuring stable power supply to a far end, and the target sampling point is the sampling point arranged at the far-end load of the server motherboard; or the current scenario is a scenario in which a far-end sampling end of a system is abnormal, and the target sampling point is the sampling point arranged close to the output end of the multi-path redundant circuit of the power supply unit.

According to one or more aspect, the present application further provides a power supply control system for a power supply unit of a server. The system includes:

a first obtaining module, configured to determine a target sampling point based on a current scenario, and obtain a sampled voltage at the target sampling point in a power supply link of the power supply unit according to a preset rule, the target sampling point being a sampling point arranged in the power supply unit, or being a sampling point arranged close to an output end of a multi-path redundant circuit of the power supply unit, or being a sampling point arranged at a far-end load of a server motherboard, and the preset rule representing a corresponding relationship between the sampled voltage at the target sampling point and an actual voltage;

a second obtaining module, configured to obtain a voltage error of the power supply link through calculation based on the sampled voltage at the target sampling point; and an adjustment module, configured to adjust a voltage of the power supply link of the power supply unit based on the voltage error of the power supply link.

According to one or more aspects, the present application further provides a computer device. The computer device includes:

one or more processors; and a memory associated with the one or more processors, where the memory is configured to store computer-readable instructions that, when read and executed by the one or more processors, cause any foregoing power supply control method for a power supply unit of a server in the first aspect to be performed.

According to one or more aspects, the present application further provides a nonvolatile computer readable storage medium, storing computer instructions that cause a computer to perform any foregoing power supply control method for a power supply unit of a server.

BRIEF DESCRIPTION OF THE DRAWINGS

In order to describe the technical solutions in the embodiments of the present application more clearly, the following briefly describes the accompanying drawings required for describing the embodiments. Apparently, the accompanying drawings in the following description show merely some embodiments of the present application, and a person of ordinary skill in the art may derive other drawings from these accompanying drawings without creative efforts.

DETAILED DESCRIPTION

In order to make objectives, technical solutions, and advantages of the present application clearer, the following clearly and completely describes the technical solutions in the embodiments of the present application with reference to the accompanying drawings in the embodiments of the present application. Apparently, the described embodiments are merely some but not all the embodiments of the present application. All other embodiments obtained by a person of ordinary skill in the art based on the embodiments of the present application without creative efforts shall fall within the scope of protection of the present application.

Figure 1:
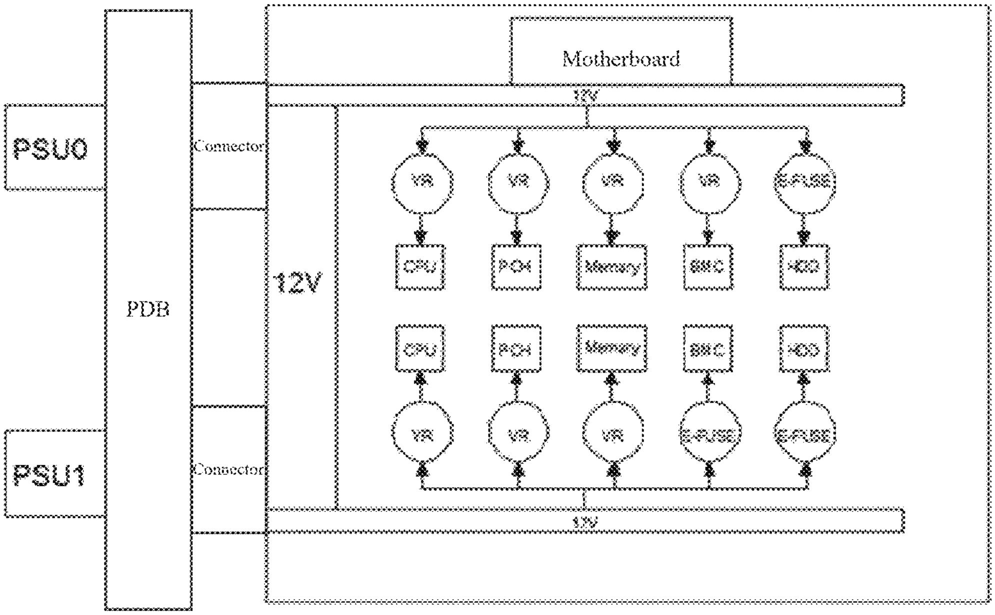
FIG. 1 is a schematic diagram of current transmission of a power supply architecture of a high-power server according to the prior art.

As described in BACKGROUND, power supply architectures of high-power servers in the prior art mostly use busbars or PCBs plated with copper on large areas for current transmission. As shown in FIG. 1, due to long power supply distances, line losses increase, and voltages at far-end power supply points may be low, poor in dynamic response, and the like, for example, a hard disk drive (HDD) in FIG. 1. As a result, there may be power supply abnormalities in case of sudden pressure changes, and server systems cannot operate normally. In order to solve the above problem and ensure stable power supply to a far-end component of the system, two technical solutions are mainly used currently.

Solution 1: A PSU of a server monitors a remote voltage to compensate for an output voltage. In this solution, a component such as a sensor is arranged at a far-end load, to monitor a voltage at a far-end power supply point, and when it is monitored that the far-end power supply point is undervoltage, a far-end power supply voltage is boosted through voltage compensation, to avoid abnormal operation of a far-end device caused by power supply undervoltage. However, in this solution, it is impossible to respond to a dynamic load at the far end quickly and effectively, which may result in a power supply abnormality for a component with high dynamics.

Solution 2: A buck-boost circuit is additionally arranged at a far-end power supply point. In this solution, a far-end power supply voltage may be stabilized effectively, and a response may be quickly made to dynamics. On the one hand, this may reduce system space and increase costs. On the other hand, it is difficult to design a buck-boost circuit for a component with a high power requirement.

In order to solve the above problems, the present application creatively proposes a power supply control method and system for a PSU of a server, a computer device, and a nonvolatile computer-readable storage medium, which can implement controlled switching of far-end and near-end sampling points and transmit a far-end voltage to an output voltage stabilizing control system in time for voltage adjustment. When a far-end load of a system fluctuates greatly, additional feedback adjustment of the far-end voltage allows a quick response to fluctuation of the far-end voltage and ensures stability of far-end power supply, so that reliability and stability of the server system are improved.

The solution of the present application will be described in detail below in combination with the accompanying drawings and embodiments in detail.

A power supply control architecture for a PSU of a server in the present application is described in this embodiment.

Figure 2:
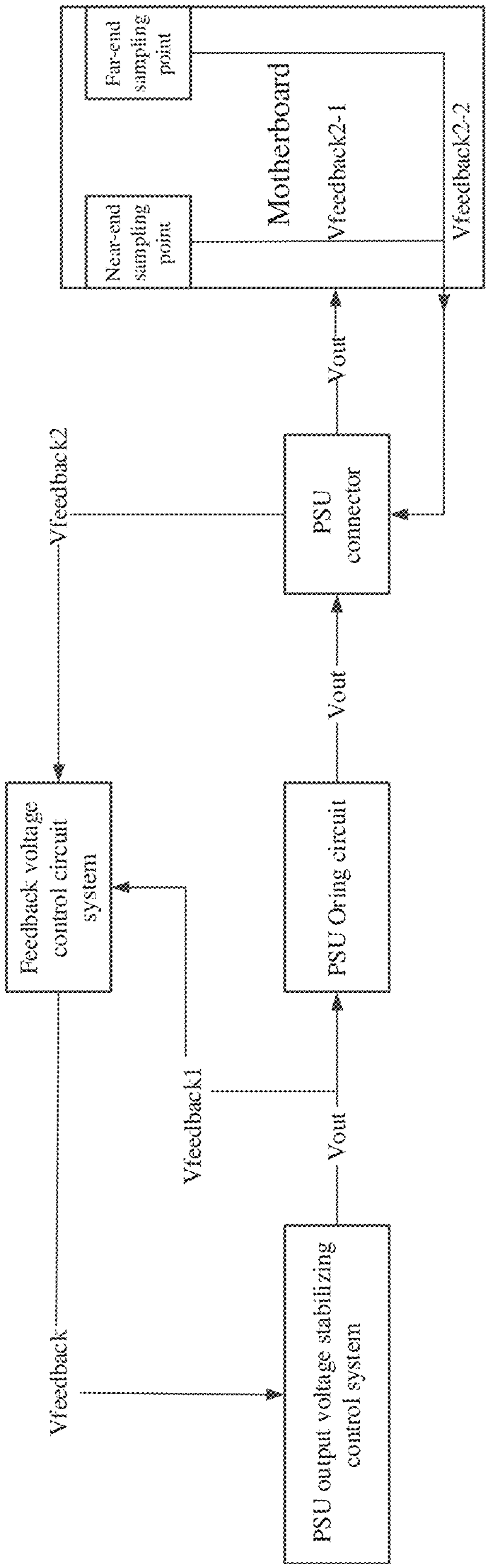
FIG. 2 is a schematic diagram of a power supply control architecture for a power supply unit of a server according to the present application.

As shown in FIG. 2, this embodiment of the present application provides a power supply control architecture for a PSU of a server. The architecture includes:

a motherboard, that is, a server motherboard or a power supply object of the PSU, where a near-end sampling point and a far-end sampling point are arranged on the motherboard; and a PSU connector, connected to the motherboard and a PSU Oring circuit, where the Oring circuit is also referred to as a multi-path redundant circuit, and the PSU Oring circuit performs an Oring control mode in a power supply link, that is, a path with a high output voltage in two supply paths is powered on while a path with a low output voltage is powered off.

The PSU Oring circuit is connected to a PSU output voltage stabilizing control system of the PSU. The PSU voltage stabilizing control system transmits an output voltage of the PSU to the motherboard via the PSU Oring circuit and a PSU controller.

A feedback voltage control circuit system is arranged in a controller inside the PSU. After powered, the motherboard feeds back voltage signals at the far-end sampling point and the near-end sampling point, and the voltage signals fed back are transmitted to the feedback voltage control circuit system via the PSU connector. The feedback voltage control circuit system adjusts the PSU output voltage stabilizing control system based on the voltage signals fed back.

Figure 3:
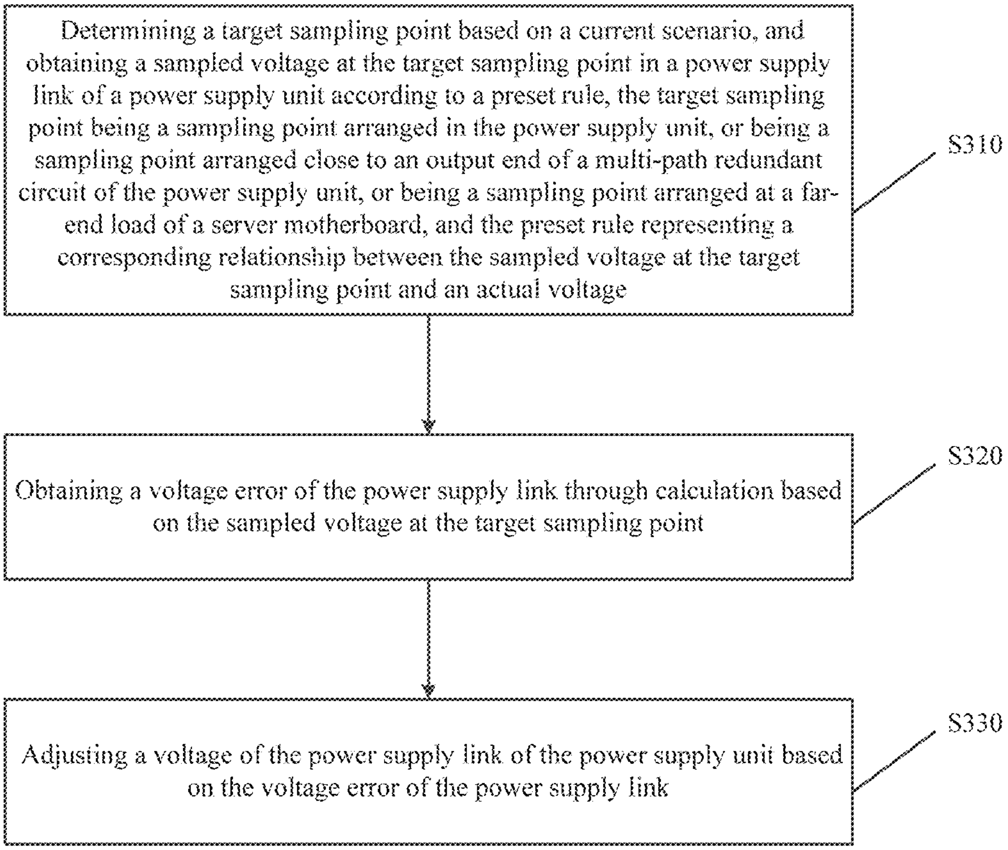
FIG. 3 is a flowchart of a power supply control method for a power supply unit of a server according to the present application.

Based on the power supply control architecture for a PSU of a server described in the above embodiment, a power supply control process for a PSU of a server in the present application is described in this embodiment in combination with FIG. 3.

This embodiment provides a power supply control process for a PSU of a server.

SA10: detecting, in response to receiving a PSU power-on instruction or a PSU power-off instruction, whether a power status of the PSU is normal.

Figure 4:
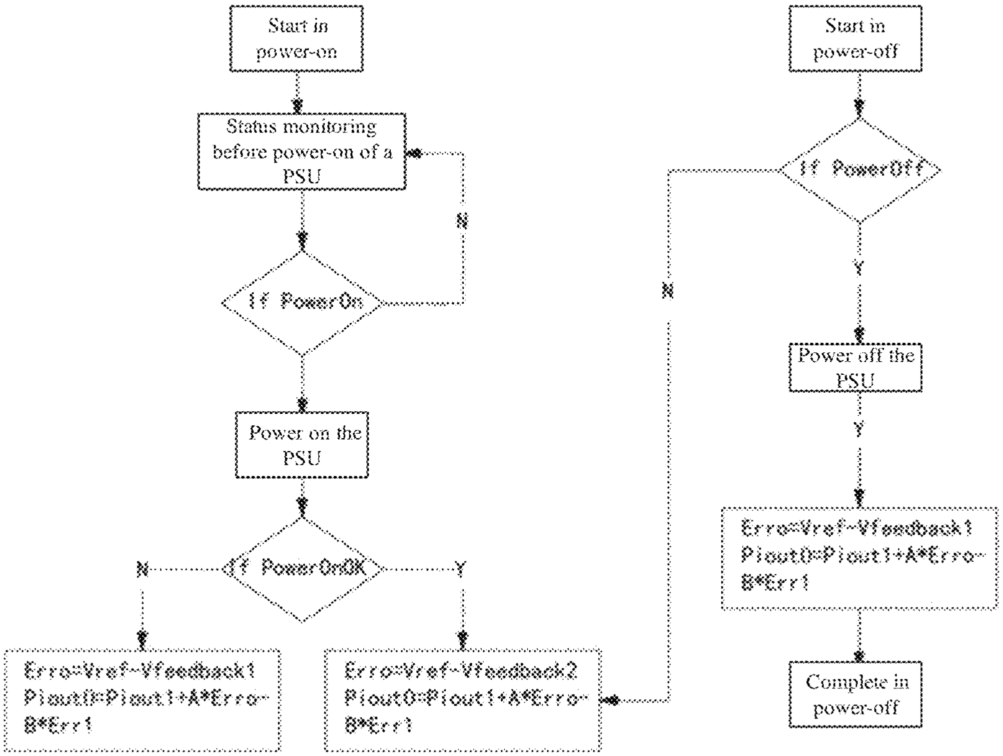
FIG. 4 is a flowchart of a power supply control method for a power supply unit of a server in a scenario in which a power supply unit of a server is powered on/off according to the present application.

As shown in FIG. 4, in a scenario in which the PSU is powered off, the detecting, in response to receiving a PSU power-off instruction, whether a power status of the PSU is normal includes: detecting, after receiving the power-off instruction, whether the PSU is powered off. In response to the power status of the PSU being normal, that is, the PSU is powered off normally after receiving the power-off instruction, the PSU is powered off, and S310 is performed.

In a scenario in which the PSU is powered on, the detecting, in response to receiving a PSU power-on instruction, whether a power status of the PSU is normal includes: detecting, after receiving the power-on instruction, whether the PSU is powered on normally for operation. In response to the power status of the PSU being normal, that is, the PSU is powered on normally for operation after receiving the power-on instruction, the PSU is powered on normally.

In some embodiments, in the scenario in which the PSU is powered on, before the detecting, after receiving the power-on instruction, whether the PSU is powered on normally for operation, the method further includes:

determining whether statuses of the PSU and an associated component of the PSU satisfy a preset condition.

After the PSU power-on instruction is received, and before the PSU is powered on normally, a microcontroller unit (MCU) arranged inside the PSU monitors a status of the PSU before the PSU is powered on, and determines whether the statuses of the PSU and the associated component of the PSU are normal. For example, the MCU monitors whether the PSU has an abnormality such as error reporting and a short-circuit, whether a fan is abnormal, and the like, and sets the preset condition based on an actual operational need of the PSU, to determine whether the statuses of the PSU and the associated component are normal.

In response to the statuses of the PSU and the associated component of the PSU satisfying the preset condition and the power status of the PSU being normal, the PSU is powered on normally, it is detected again that power of the PSU is normal, and S310 is performed.

In response to the power status of the PSU being abnormal, the part performed when it is detected that the statuses of the PSU and the associated component of the PSU do not satisfy the preset condition is performed, and detection information is sent to a manager for error reporting.

S310: determining a target sampling point based on a current scenario, and obtaining a sampled voltage at the target sampling point in a power supply link of the PSU according to a preset rule, the target sampling point being a sampling point arranged in the PSU, or being a sampling point arranged close to an output end of the PSU ORing, or being a sampling point arranged at a far-end load of the server motherboard, and the preset rule representing a corresponding relationship between the sampled voltage at the target sampling point and an actual voltage.

Figure 5:
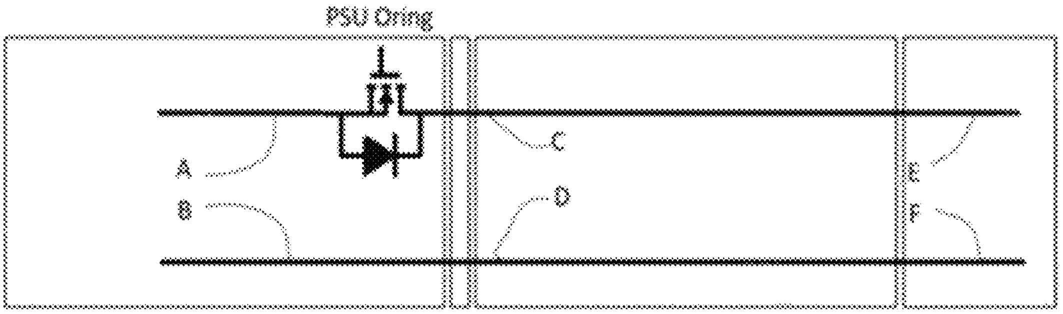
FIG. 5 is a schematic diagram of a sampling point design in a power supply control method for a power supply unit of a server according to the present application.

As shown in FIG. 5, a sampling point design of the PSU includes points A and B, points C and D, and points E and F. The sampling points A and B are feedback voltage sampling points at a turn-on/off moment of the PSU, and are arranged at the front (a current input end) of the PSU ORing. The sampling points C and D are near-end feedback voltage sampling points of the system for near-end feedback voltage abnormalities of the system, and are arranged at the back (a current output end) of the PSU ORing, close to the output end of the PSU ORing. The sampling points E and F are far-end sampling points of the motherboard of the server system for far-end voltage control of the system.

In an implementation, a first differential amplification circuit and a second differential amplification circuit are connected to the power supply link of the PSU. The sampling point in the PSU, that is, the sampling points A and B, is connected to the first differential amplification circuit. The sampling point close to the output end of the PSU ORing, that is, the sampling points C and D, and the sampling point arranged at the far-end load of the server motherboard, that is, the sampling points E and F, are connected to the second differential amplification circuit.

This step includes the following steps.

S311: determining the target sampling point based on the current scenario, and obtaining a target sampling point voltage.

The current scenario is a scenario in which the PSU is powered on normally, or a scenario in which the PSU is powered off normally, or a scenario of ensuring stable power supply to a far end, or a scenario in which a far-end sampling point of the system is abnormal. A scenario corresponding to the current scenario is determined, and then the target sampling point voltage is determined based on the determined corresponding scenario.

In response to the current scenario being the scenario in which the PSU is powered on normally, this step includes: determining, based on the scenario in which the PSU is powered on normally, that the target sampling point is the sampling point arranged in the PSU, and obtaining a voltage at the sampling point arranged in the PSU, that is, sampled voltages at the sampling points A and B.

In response to the current scenario being the scenario in which the PSU is powered off normally, this step includes: determining, based on the scenario in which the PSU is powered off, that the target sampling point is the sampling point arranged in the PSU, and obtaining a voltage at the sampling point arranged in the PSU, that is, sampled voltages at the sampling points A and B.

In response to the current scenario being the scenario of ensuring stable power supply to the far end, this step includes: determining, based on the scenario of ensuring stable power supply to the far end, that the target sampling point is the sampling point arranged at the far-end load on the server motherboard, and obtaining a voltage at the sampling point arranged at the far-end load of the server motherboard, that is, sampled voltages at the sampling points E and F.

In response to the current scenario being the scenario in which the far-end sampling point of the system is abnormal, this step includes: determining, based on the scenario in which the far-end sampling point of the system is abnormal, that the target sampling point is the sampling point arranged close to the output of the PSU ORing, and obtaining a voltage at the sampling point arranged close to the output end of the PSU ORing, that is, sampled voltages at the sampling points C and D.

Figure 6:
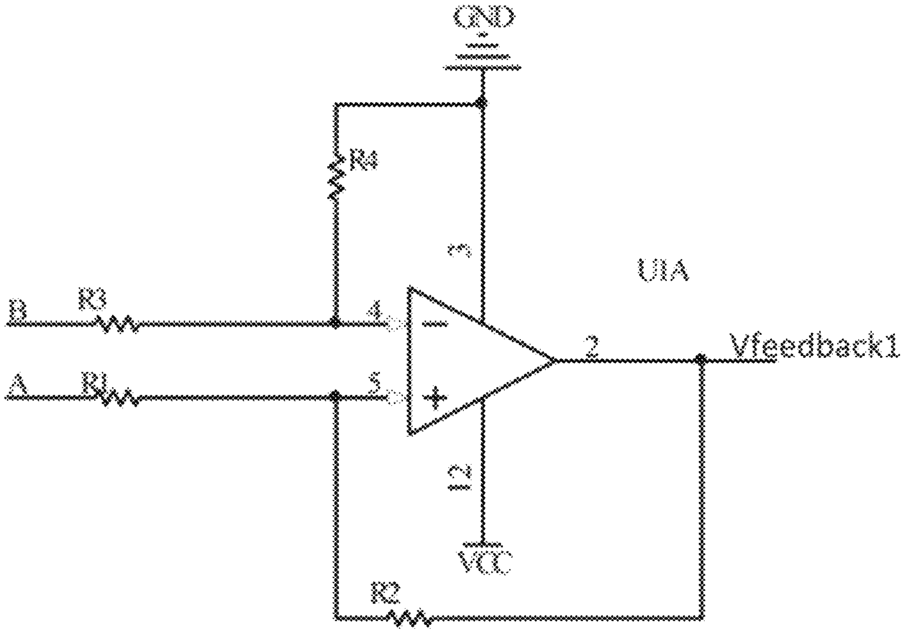
FIG. 6 is a schematic diagram of a first differential amplification circuit in a power supply control method for a power supply unit of a server according to the present application.

The first differential amplification circuit is arranged at the sampling points A and B, to ensure sampling accuracy at the sampling points A and B. As shown in FIG. 6, the first differential amplification circuit includes a first input end, a second input end, and a first output end. The first input end and the second input end are connected to the sampling points A and B arranged in the PSU. The first output end outputs a first linearly amplified signal representing a sampled voltage of the first differential amplification circuit.

The first differential amplification circuit includes a first resistor, a second resistor, a third resistor, a fourth resistor, and a first operational amplifier.

One end of the first resistor is connected as the first input end of the first differential amplification circuit to the sampling point A arranged in the PSU. The other end of the first resistor is connected to an in-phase input end of the first operational amplifier and one end of the second resistor. The other end of the second resistor is connected to an output end of the first operational amplifier.

One end of the third resistor is connected as the second input end of the first differential amplification circuit to the sampling point B arranged in the PSU. The other end of the third resistor is connected to an inverting input end of the first operational amplifier and one end of the fourth resistor. The other end of the fourth resistor is grounded.

In some embodiments, the first resistor is equal to the third resistor, and the second resistor is equal to the fourth resistor.

Figure 7:
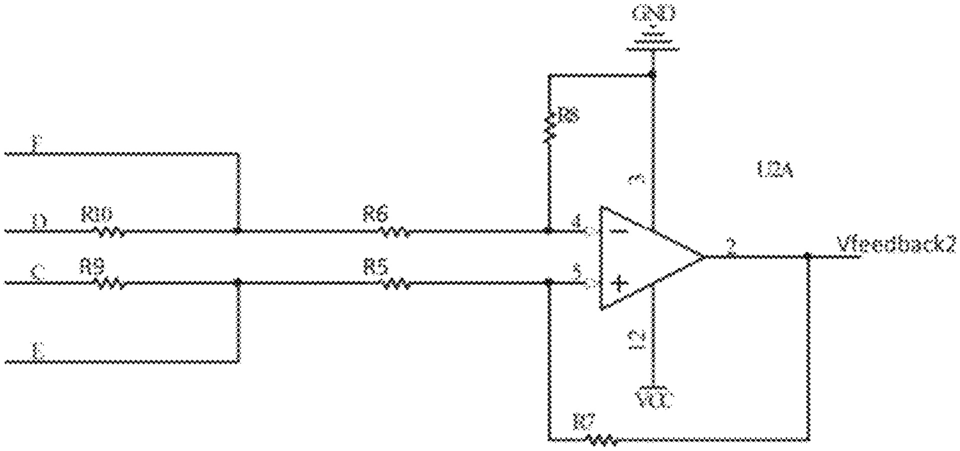
FIG. 7 is a schematic diagram of a second differential amplification circuit in a power supply control method for a power supply unit of a server according to the present application.

A same differential amplification circuit, that is, the second differential amplification circuit, is shared by the sampling points C and D and the sampling points E and F. As shown in FIG. 7, the second differential amplification circuit includes a third input end, a fourth input end, a fifth input end, a sixth input end, and a second output end.

The third input end and the fourth input end are connected to the sampling point arranged close to the output end of the PSU ORing, that is, the sampling points C and D. The fifth input end and the sixth input end are connected to the sampling point arranged at the far-end load of the server motherboard, that is, the sampling points E and F. The second output end outputs a second linearly amplified signal representing the sampled voltage of the second differential amplification circuit.

The second differential amplification circuit includes a fifth resistor, a sixth resistor, a seventh resistor, an eighth resistor, a ninth resistor, a tenth resistor, and a second operational amplifier. One end of the ninth resistor is connected as the third input end of the second differential amplification circuit to the sampling point C arranged close to the output end of the PSU ORing. The other end of the ninth resistor is connected to the fifth resistor. One end of the fifth resistor is connected to the other end of the ninth resistor, and is connected as the fifth input end of the second differential amplification circuit to the sampling point E arranged at the far-end load of the server motherboard. The other end of the fifth resistor is connected to an in-phase input end of the second operational amplifier and one end of the seventh resistor. The other end of the seventh resistor is connected to the output end of the second operational amplifier.

One end of the tenth resistor is connected as the fourth input end of the second differential amplification circuit to the sampling point D arranged close to the output end of the PSU ORing. The other end of the tenth resistor is connected to the sixth resistor. One end of the sixth resistor is connected to the tenth resistor, and is connected as the sixth input end of the second differential amplification circuit to the sampling point F arranged at the far-end load of the server motherboard. The other end of the sixth resistor is connected to an inverting input end of the second operational amplifier and one end of the eighth resistor. The other end of the eighth resistor is grounded.

In some embodiments, the fifth resistor is equal to the sixth resistor, the ninth resistor is equal to the tenth resistor, and the seventh resistor is equal to the eighth resistor.

In response to the far-end sampling points E and F of the system being abnormal or being not connected, the second linearly amplified signal is obtained through calculation based on the voltages of the near-end sampling points C and D of the system.

In response to the far-end points E and F of the system being connected, because no resistor is connected in series to the points E and F, sampling feedback effects of the sampling points C and D may be substantially ignored, that is, the sampling points C and D are bypassed, the second linearly amplified signal is obtained through calculation based on the voltages at the near-end sampling points E and F of the system.

S312: obtaining the sampled voltage of the first differential amplification circuit or the second differential amplification circuit through calculation according to the preset rule and the target sampling point voltage.

In response to the current scenario being the scenario in which the PSU is powered on normally, this step includes:

obtaining the sampled voltage of the first differential amplification circuit through calculation according to the preset rule and the voltage at the sampling point arranged in the PSU, that is, obtaining the sampled voltage of the first differential amplification circuit through calculation based on the voltages at the sampling points A and B in response to the current scenario being the scenario in which the PSU is powered on normally:

$$Vfeedback1 = R2/R1 * Vab$$

Vfeedback1 indicates the sampled voltage of the first differential amplification circuit, that is, the sampled voltages at the sampling points A and B. Vab indicates the voltages at the sampling points A and B.

In response to the current scenario being the scenario in which the PSU is powered off normally, this step includes:

obtaining the sampled voltage of the first differential amplification circuit through calculation according to the preset rule and the voltage at the sampling point arranged in the PSU, that is, obtaining the sampled voltage of the first differential amplification circuit through calculation based on the voltages at the sampling points A and B in response to the current scenario being the scenario in which the PSU is powered on normally:

$$Vfeedback1 = R2/R1 * Vab$$

In response to the current scenario being the scenario of ensuring stable power supply to the far end, the far-end sampling points E and F of the system are connected normally, feedback effects of the sampling points C and D may be substantially ignored, that is, the sampling points are bypassed, and the sampled voltage of the second differential amplification circuit is obtained through calculation based on the voltages at the far-end sampling points E and F of the system. This step includes:

obtaining the sampled voltage of the second differential amplification circuit through calculation according to the preset rule and the voltage at the sampling point arranged at the far-end load of the server motherboard, that is, obtaining the sampled voltage of the second differential amplification circuit through calculation based on the voltages at the sampling points E and F in response to the current scenario being the scenario of ensuring stable power supply to the far end:

$$Vfeedback2 = R7/R5 * Vef$$

Vfeedback2 indicates the sampled voltage of the second differential amplification circuit. Vef indicates the voltages at the sample points E and F.

In response to the current scenario being the scenario in which the far-end sampling point of the system is abnormal, the far-end sampling points E and F of the system are connected abnormally or not connected, and the sampled voltage of the second differential amplification circuit is obtained through calculation based on the voltages at the near-end sampling points C and D of the system. This step includes:

obtaining the sampled voltage of the second differential amplification circuit according to the preset rule and the voltage at the sampling point arranged close to the output end of the PSU ORing, that is, obtaining the sampled voltage of the second differential amplification circuit through calculation based on the voltages at the sampling points C and D in response to the current scenario is the scenario in which the far-end sampling point of the system is abnormal:

$$Vfeedback2 = R7/(R5 + R9) * Vcd$$

Vcd indicates the voltages at the sampling points C and D.

SA20: obtaining a specified value of an output voltage of the PSU.

A target output voltage of the PSU is obtained, that is, the specified value of the output voltage of the PSU. A voltage error is calculated based on the specified value of the output voltage of the PSU and an actual voltage in the power supply link, to adjust a voltage of the link.

S320: obtaining the voltage error of the power supply link through calculation based on the sampled voltage at the target sampling point.

This step includes: calculating a difference between the specified value of the output voltage of the PSU and the sampled voltage at the target sampling point, to obtain the voltage error of the power supply link.

A stabilized-voltage power supply working condition is mainly classified as the following three: a working condition in which the PSU is turned on, a working condition in which the PSU operates normally, and a working condition in which the PSU is turned off. Control link switch may be implemented in different working conditions.

1. When the PSU is turned on normally, a system end voltage cannot be recognized by the PSU due to a limit of a PSU Oring diode. Therefore, at a turn-on moment, the feedback voltage is obtained by the sampling points A and B, and the sampling points C and D and the sampling points E and F do not participate in feedback of the link.

$$Erro = Vref - Vfeedback1.$$

Erro indicates a voltage error calculated in case of this interruption. Vref indicates the specified value of the output voltage of the PSU.

2. When the PSU operates normally, after the PSU is powered on, the sampling points E and F at the far-end load of the server motherboard are used for control as fast-link feedback voltages, to ensure stable power supply to the far end of the server system, so that a quick response may be made to the far-end load of the server motherboard.

$$Erro = Vref - Vfeedback2.$$

3. When the PSU is turned off, because a primary-side output voltage of the PSU is reduced, to satisfy an output voltage of a link that is wholly used as an LLC resonant converter, a gain of an LLC resonant converter increases. Due to a long path, a great parasitic parameter may be generated in far-end sampling of the server, affecting link control. Therefore, the sampling points A and B at the front of the PSU Oring are used for control as slow-quick feedback voltages:

$$Erro = Vref - Vfeedback1.$$

S330: adjusting the voltage of the power supply link of the PSU based on the voltage error of the power supply link.

In an implementation, this step includes the following steps.

S331: obtaining a link operating frequency through calculation based on the voltage error of the power supply link.

This step includes the following steps.

S3311: obtaining an output value of a target Pi controller through calculation based on the voltage error of the power supply link.

$$Piout0 = Piout1 + A * Erro - B * Err1$$

Erro indicates the voltage error calculated in case of this interruption. Err1 indicates a voltage error calculated in case of a previous interruption. Piout0 indicates a currently calculated output value of a Pi controller in the MCU arranged inside the PSU. Piout1 indicates a previously calculated output value of the Pi controller in the MCU arranged inside the PSU. A=Kp+Ki. B=Ki. Kp and Ki are coefficients.

S3312: obtaining the link operating frequency based on a mapping relationship between an output value of a Pi controller and a link operating frequency, and the output value of the target Pi controller.

S332: adjusting the voltage of the power supply link of the PSU based on the link operating frequency.

Formula calculation may be performed for a plurality of times in a voltage regulation process, so that the output value of the Pi controller is accumulatively calculated. Erro is involved in power link calculation. The voltage error is obtained through link calculation. The output value of the Pi controller is obtained through calculation based on the voltage error. The output value of the Pi controller corresponds to an operating frequency of the LLC resonant converter, that is, the whole link. The frequency of the LLC resonant converter is adjusted, to implement adjustment of the output voltage.

According to the power supply control method for a PSU of a server provided in this embodiment, the sampling points A and B are arranged in the PSU, the sampling points C and D are arranged close to the output end of the PSU ORing, and the sampling points E and F are arranged at the far-end load of the server system. The first differential amplification circuit is arranged at the sampling points A and B, and the second differential amplification circuit is shared by the sampling points C and D and the sampling points E and F. When a far-end voltage needs to be acquired, the far-end sampling points E and F are connected, and the sampling points C and D are bypassed, so that controlled switching of the far-end and near-end sampling points may be implemented at the far end of the system, and the far-end voltage may be transmitted to the output voltage stabilizing control system in time for voltage adjustment. When the far-end load of the system fluctuates greatly, additional feedback adjustment of the far-end voltage allows the PSU output voltage stabilizing control system to quickly respond to the fluctuation of the far-end voltage and ensure stability of far-end power supply, so that reliability and stability of the server system are improved.

Figure 8:
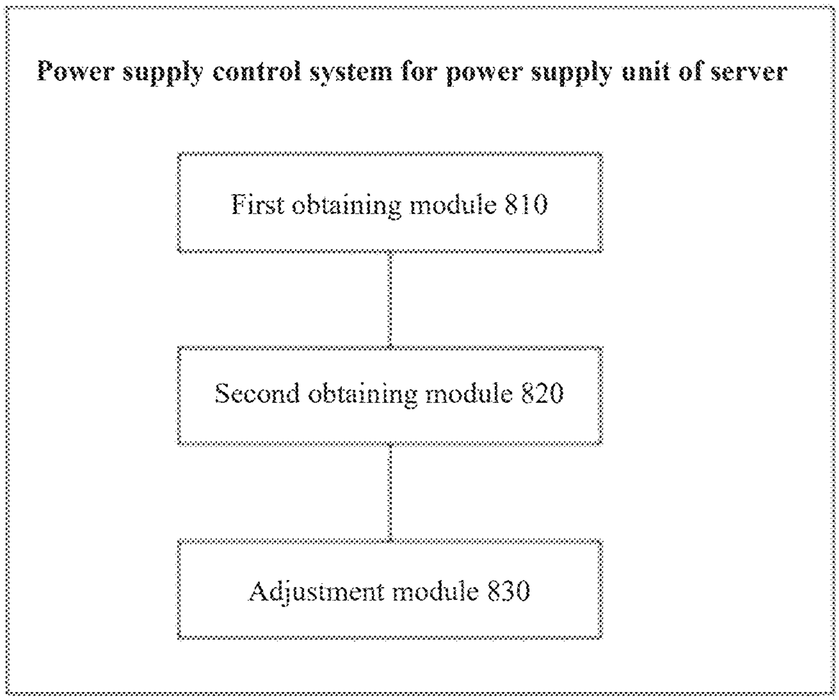
FIG. 8 is a diagram of an architecture of a power supply control system for a power supply unit of a server according to the present application.

Corresponding to the above embodiment, the following describes, in combination with FIG. 8, a power supply control system for a PSU of a server provided in the present application. The system may be implemented by hardware or software, or may be implemented by a combination of hardware and software. This is not limited in the present application.

In an example, the present application provides a power supply control system for a PSU of a server. The power supply control system for a PSU of a server includes:

a first obtaining module 810, configured to determine a target sampling point based on a current scenario, and obtain a sampled voltage at the target sampling point in a power supply link of the PSU according to a preset rule, the target sampling point being a sampling point arranged in the PSU, or being a sampling point arranged close to an output end of PSU ORing, or being a sampling point arranged at a far-end load of a server motherboard, and the preset rule representing a corresponding relationship between the sampled voltage at the target sampling point and an actual voltage;

a second obtaining module 820, configured to obtain a voltage error of the power supply link through calculation based on the sampled voltage at the target sampling point; and an adjustment module 830, configured to adjust a voltage of the power supply link of the PSU based on the voltage error of the power supply link.

In an implementation, a first differential amplification circuit and a second differential amplification circuit are connected to the power supply link of the PSU, where the sampling point in the PSU is connected to the first differential amplification circuit, and the sampling point close to the output end of the PSU Oring and the sampling point arranged at the far-end load of the server motherboard are connected to the second differential amplification circuit.

The first obtaining module 810 includes:

a first obtaining unit 811, configured to determine the target sampling point based on the current scenario, and obtain a target sampling point voltage; and a second obtaining unit 812, configured to obtain a sampled voltage of the first differential amplification circuit or the second differential amplification circuit through calculation according to the preset rule and the target sampling point voltage.

In some embodiments, the current scenario is a scenario in which the PSU is turned on normally. The first obtaining unit 811 includes:

a first obtaining subunit 8111, configured to obtain, based on the scenario in which the PSU is turned on normally, a voltage at the sampling point arranged in the PSU.

The second obtaining unit 812 includes:

a first calculation subunit 8121, configured to obtain the sampled voltage of the first differential amplification circuit through calculation according to the preset rule and the voltage at the sampling point arranged in the PSU.

In some embodiments, the first differential amplification circuit includes a first input end, a second input end, and a first output end, where the first input end and the second input end are connected to the sampling point arranged in the PSU, and the first output end outputs a first linearly amplified signal representing the sampled voltage of the first differential amplification circuit.

In some embodiments, the first differential amplification circuit includes a first resistor, a second resistor, a third resistor, a fourth resistor, and a first operational amplifier.

One end of the first resistor is connected as the first input end of the first differential amplification circuit to a sampling point A arranged in the PSU. The other end of the first resistor is connected to an in-phase input end of the first operational amplifier and one end of the second resistor. The other end of the second resistor is connected to an output end of the first operational amplifier.

One end of the third resistor is connected as the second input end of the first differential amplification circuit to a sampling point B arranged in the PSU. The other end of the third resistor is connected to an inverting input end of the first operational amplifier and one end of the fourth resistor. The other end of the fourth resistor is grounded.

In some embodiments, the first resistor is equal to the third resistor, and the second resistor is equal to the fourth resistor.

In some embodiments, the current scenario in a scenario of ensuring stable power supply to a far end. The first obtaining unit 811 includes:

a second obtaining subunit 8112, configured to obtain, based on the scenario of ensuring stable power supply to the far end, a voltage at the sampling point arranged at the far-end load of the server motherboard.

The second obtaining unit 812 includes:

a second calculation subunit 8122, configured to obtain the sampled voltage of the second differential amplification circuit through calculation according to the preset rule and the voltage at the sampling point arranged at the far-end load of the server motherboard.

In some embodiments, the current scenario is a scenario in which the PSU is turned off. The first obtaining unit 811 includes:

a third obtaining subunit 8113, configured to obtain, based on the scenario in which the PSU is turned off, a voltage at the sampling point arranged in the PSU.

The second obtaining unit 812 includes:

a third calculation subunit 8123, configured to obtain the sampled voltage of the first differential amplification circuit through calculation according to the preset rule and the voltage at the sampling point arranged in the PSU.

In some embodiments, the current scenario is a scenario in which a far-end sampling point of a system is abnormal. The first obtaining unit 811 includes:

a fourth obtaining subunit 8114, configured to obtain, based on the scenario in which the far-end sampling point of the system is abnormal, a voltage at the sampling point arranged close to the output end of the PSU ORing.

The second obtaining unit 812 includes:

a fourth calculation subunit 8124, configured to obtain the sampled voltage of the second differential amplification circuit through calculation according to the preset rule and the voltage at the sampling point close to the output end of the PSU ORing.

In some embodiments, the second differential amplification circuit includes a third input end, a fourth input end, a fifth input end, a sixth input end, and a second output end.

The third input end and the fourth input end are connected to the sampling point close to the output end of the PSU ORing. The fifth input end and the sixth input end are connected to the sampling point arranged at the far-end load of the server motherboard. The second output end outputs a second linearly amplified signal representing the sampled voltage of the second differential amplification circuit.

In some embodiments, the second differential amplification circuit includes a fifth resistor, a sixth resistor, a seventh resistor, an eighth resistor, a ninth resistor, a tenth resistor, and a second operational amplifier.

One end of the ninth resistor is connected as the third input end of the second differential amplification circuit to a sampling point C arranged close to the output end of the PSU ORing. The other end of the ninth resistor is connected to the fifth resistor. One end of the fifth resistor is connected to the other end of the ninth resistor, and is connected as the fifth input end of the second differential amplification circuit to a sampling point E arranged at the far-end load of the server motherboard. The other end of the fifth resistor is connected to an in-phase input end of the second operational amplifier and one end of the seventh resistor. The other end of the seventh resistor is connected to the output end of the second operational amplifier.

One end of the tenth resistor is connected as the fourth input end of the second differential amplification circuit to a sampling point D arranged close to the output end of the PSU ORing. The other end of the tenth resistor is connected to the sixth resistor. One end of the sixth resistor is connected to the tenth resistor, and is connected as the sixth input end of the second differential amplification circuit to a sampling point F arranged at the far-end load of the server motherboard. The other end of the sixth resistor is connected to an inverting input end of the second operational amplifier and one end of the eighth resistor. The other end of the eighth resistor is grounded.

In some embodiments, the fifth resistor is equal to the sixth resistor, the ninth resistor is equal to the tenth resistor, and the seventh resistor is equal to the eighth resistor.

In some embodiments, the system further includes:

a third obtaining module 840, configured to obtain a specified value of an output voltage of the PSU before the second obtaining module 820 obtains the voltage error of the power supply link through calculation based on the sampled voltage at the target sampling point.

The second obtaining module 820 includes:

a first calculation unit 821, configured to calculate a difference between the specified value of the output voltage of the PSU and the sampled voltage at the target sampling point, to obtain the voltage error of the power supply link.

In some embodiments, the adjustment module 830 includes:

a second calculation unit 831, configured to obtain a link operating frequency based on the voltage error of the power supply link; and an adjustment unit 832, configured to adjust the voltage of the power supply link of the PSU based on the link operating frequency.

In some embodiments, the second calculation unit 831 includes:

a fifth calculation subunit 8311, configured to obtain an output value of a target Pi controller through calculation based on the voltage error of the power supply link; and a fifth obtaining subunit 8312, configured to obtain the link operating frequency based on a mapping relationship between an output value of a Pi controller and a link operating frequency, and the output value of the target Pi controller.

In some embodiments, the system further includes:

a detection module 850, configured to: before the first obtaining module 810 obtains the sampled voltage at the target sampling point in the power supply link of the PSU based on the current scenario and the preset rule, detect, in response to receiving a PSU power-on instruction or a PSU power-off instruction, whether a power status of the PSU is normal.

In response to a detection result obtained by the detection module 850 by detecting whether the power status of the PSU is normal being YES, the first obtaining module 810 obtains the sampled voltage at the target sampling point in the power supply link of the PSU based on the current scenario and the preset rule.

In some embodiments, the system further includes:

a determining module 860, configured to: before the detection module 850 detects, in response to receiving the PSU power-on instruction, whether the power status of the PSU is normal, determine whether statuses of the PSU and an associated component of the PSU satisfy a preset condition.

In response to the statuses of the PSU and the associated component of the PSU satisfying the preset condition, the detection module 850 detects whether the power status of the PSU is normal.

Figure 9:
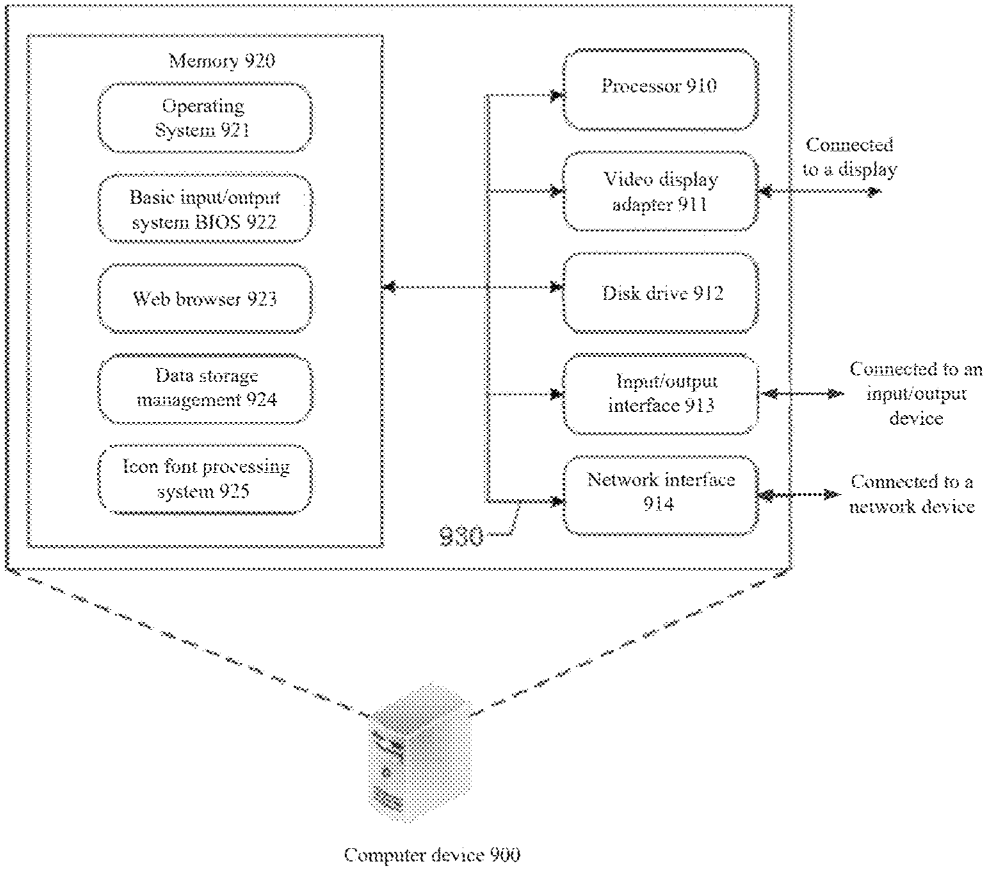
FIG. 9 is a diagram of an architecture of a computer device according to the present application.

Corresponding to the above embodiment, the following describes, in combination with FIG. 9, a computer device provided in the present application. In an example, as shown in FIG. 9, the present application provides a computer device. The computer device includes:

one or more processors; and a memory associated with the one or more processors, where the memory is configured to store computer-readable instructions that, when read and executed by the one or more processors, cause the following operations to be performed:

determining a target sampling point based on a current scenario, and obtaining a sampled voltage at the target sampling point in a power supply link of a PSU according to a preset rule, the target sampling point being a sampling point arranged in the PSU, or being a sampling point arranged close to an output end of PSU ORing, or being a sampling point arranged at a far-end load of a server motherboard, and the preset rule representing a corresponding relationship between the sampled voltage at the target sampling point and an actual voltage;

obtaining a voltage error of the power supply link through calculation based on the sampled voltage at the target sampling point; and adjusting a voltage of the power supply link of the PSU based on the voltage error of the power supply link.

A first differential amplification circuit and a second differential amplification circuit are connected to the power supply link of the PSU, where the sampling point in the PSU is connected to the first differential amplification circuit, and the sampling point close to the output end of the PSU Oring and the sampling point arranged at the far-end load of the server motherboard are connected to the second differential amplification circuit.

The computer-readable instructions, when read and executed by the one or more processors, further cause the following operations to be performed:

determining the target sampling point based on the current scenario, and obtaining a target sampling point voltage; and obtaining a sampled voltage of the first differential amplification circuit or the second differential amplification circuit through calculation according to the preset rule and the target sampling point voltage.

The current scenario is a scenario in which the PSU is turned on normally. The computer-readable instructions, when read and executed by the one or more processors, further cause the following operations to be performed:

obtaining, based on the scenario in which the PSU is turned on normally, a voltage at the sampling point arranged in the PSU.

The obtaining a sampled voltage of the first differential amplification circuit or the second differential amplification circuit through calculation according to the preset rule and the target sampling point voltage includes:

obtaining the sampled voltage of the first differential amplification circuit through calculation according to the preset rule and the voltage at the sampling point arranged in the PSU.

The current scenario is a scenario of ensuring stable power supply to a far end. The computer-readable instructions, when read and executed by the one or more processors, further cause the following operations to be performed:

obtaining, based on the scenario of ensuring stable power supply to the far end, a voltage at the sampling point arranged at the far-end load of the server motherboard.

The obtaining a sampled voltage of the first differential amplification circuit or the second differential amplification circuit through calculation according to the preset rule and the target sampling point voltage includes:

obtaining the sampled voltage of the second differential amplification circuit through calculation according to the preset rule and the voltage at the sampling point arranged at the far-end load of the server motherboard.

The current scenario is a scenario in which the PSU is turned off. The computer-readable instructions, when read and executed by the one or more processors, further cause the following operations to be performed:

obtaining, based on the scenario in which the PSU is turned off, a voltage at the sampling point arranged in the PSU.

The obtaining a sampled point voltage of the first differential amplification circuit or the second differential amplification circuit through calculation according to the preset rule and the target sampling point voltage includes:

obtaining the sampled voltage of the first differential amplification circuit through calculation according to the preset rule and the voltage at the sampling point arranged in the PSU.

The current scenario is a scenario in which a far-end sampling point of a system is abnormal. The computer-readable instructions, when read and executed by the one or more processors, further cause the following operations to be performed:

obtaining, based on the scenario in which the far-end sampling point of the system is abnormal, a voltage at the sampling point arranged close to the output end of the PSU ORing.

The obtaining a sampled point voltage of the first differential amplification circuit or the second differential amplification circuit through calculation according to the preset rule and the target sampling point voltage includes:

obtaining the sampled voltage of the second differential amplification circuit through calculation according to the preset rule and the voltage at the sampling point close to the output end of the PSU ORing.

The computer-readable instructions, when read and executed by the one or more processors, further cause the following operations to be performed:

obtaining a specified value of an output voltage of the PSU; and calculating a difference between the specified value of the output voltage of the PSU and the sampled voltage at the target sampling point, to obtain the voltage error of the power supply link.

The computer-readable instructions, when read and executed by the one or more processors, further cause the following operations to be performed:

obtaining a link operating frequency based on the voltage error of the power supply link; and adjusting the voltage of the power supply link of the PSU based on the link operating frequency.

The computer-readable instructions, when read and executed by the one or more processors, further cause the following operations to be performed:

obtaining an output value of a target Pi controller through calculation based on the voltage error of the power supply link; and obtaining the link operating frequency based on a mapping relationship between an output value of a Pi controller and a link operating frequency, and the output value of the target Pi controller.

The computer-readable instructions, when read and executed by the one or more processors, further cause the following operations to be performed:

detecting, in response to receiving a PSU power-on instruction or a PSU power-off instruction, whether a power status of the PSU is normal; and obtaining the sampled voltage at the target sampling point in the power supply link of the PSU based on the current scenario and the preset rule in response to detecting that the power status of the PSU is normal.

The computer-readable instructions, when read and executed by the one or more processors, further cause the following operation to be performed:

determining whether statuses of the PSU and an associated component of the PSU satisfy a preset condition.

In response to determining that the statuses of the PSU and the associated component of the PSU satisfying the preset condition, the computer-readable instructions cause the detecting whether a power status of the power supply unit is normal to be performed.

The computer-readable instructions, when read and executed by the one or more processors, may further cause operations corresponding to the steps in the method embodiment to be performed. Reference may be made to the above descriptions, and details are not described herein again. As shown in FIG. 9, which shows an example of an architecture of the computer device, which may include a processor 910, a video display adapter 911, a disk drive 912, an input/output interface 913, a network interface 914, and a memory 920. The processor 910, the video display adapter 911, the disk drive 912, the input/output interface 913, the network interface 914, and the memory 920 may be communicatively connected to one another through a communication bus 930.

The processor 910 may be implemented by a general-purpose central processing unit (CPU), a microprocessor, an application-specific integrated circuit (ASIC), one or more integrated circuits, or the like, and is configured to execute a related program, to implement the technical solutions provided in the present application.

The memory 920 may be implemented in a form of a read-only memory (ROM), a random access memory (RAM), a static storage device, a dynamic storage device, or the like. The memory 920 may store an operating system 921 configured to control the computer device 400 to run and a basic input/output system (BIOS) 922 configured to control a low-level operation of the computer device 900. In addition, the memory may further store a web browser 923, data storage management 924, an icon font processing system 925, and the like. The icon font processing system 925 may be an application that specifically implements operations in the foregoing steps in the embodiments of the present application. In summary, when the technical solutions provided in the present application are implemented by software or firmware, related program code is stored in the memory 920 and invoked and executed by the processor 910.

The input/output interface 913 is configured to be connected to an input/output module, to implement information input and output. The input/output module may be configured in the device as an assembly (not shown in this figure), or may be connected to the device to provide a corresponding function. An input device may include a keyboard, a mouse, a touchscreen, a microphone, various sensors, and the like. An output device may include a display, a speaker, a vibrator, an indicator lamp, and the like.

The network interface 914 is configured to be connected to a communication module (not shown in this figure), to implement communication interaction between this device and another device. The communication module may implement communication in a wired manner (for example, a USB or a network cable), or may implement communication in a wireless manner (for example, a mobile network, wireless fidelity (Wi-Fi), or Bluetooth).

The bus 930 include a path, to transmit information between the components of the device (for example, the processor 910, the video display adapter 911, the disk drive 912, the input/output interface 913, the network interface 914, and the memory 920).

In addition, the computer device 900 may further obtain information about a claiming condition from a virtual resource object claiming condition information database 941, for condition determining, and the like.

It should be noted that although only the processor 910, the video display adapter 911, the disk drive 912, the input/output interface 913, the network interface 914, the memory 920, the bus 930, and the like of the computer device 900 are shown, in specific implementation, the computer device may further include other components required for normal running. In addition, it may be understood by a person skilled in the art that the device may alternatively include only components required for implementing the solutions in the present application, rather than include all the components shown in this figure.

It can be learned from the above descriptions of the implementations that a person skilled in the art can clearly understand that the present application can be implemented by using software and a necessary general hardware platform. Based on such an understanding, the technical solutions in the present application essentially or the part contributing to the prior art may be represented in a form of a software product. The computer software product may be stored in a storage medium, for example, a ROM/RAM, a magnetic disk, or an optical disc, and includes several instructions for instructing a computer device (which may be a personal computer, a server, a network device, or the like) to perform the method described in the embodiments of this application or in some parts of the embodiments.

Corresponding to the above embodiment, the following describes a nonvolatile computer-readable storage medium provided in the present application. In an example, the present application provides a nonvolatile computer readable storage medium, storing computer instructions that cause a computer to perform any foregoing power supply control method for a power supply unit of a server.

The embodiments in this specification are all described in a progressive manner. For same or similar parts in the embodiments, mutual reference may be made. Each embodiment focuses what is different from other embodiments. Especially, the apparatus embodiments are basically similar to the method embodiments, and therefore are described briefly. For related parts, refer to partial descriptions in the method embodiments. The described apparatus embodiments are merely examples. The modules described as separate parts may or may not be physically separated, and parts shown as modules may or may not be physical modules, may be located in one position, or may be distributed on a plurality of network modules. Some or all of the modules may be selected according to actual needs to achieve the objectives of the solutions of the embodiments, which can be understood and implemented by those of ordinary skill in the art without involving any inventive effort.

In addition, it should be understood that the terms "first" and "second" in the present application are merely intended for a purpose of description, and shall not be understood as an indication or implication of relative importance or implicit indication of the number of indicated technical features. Therefore, a feature limited by "first" or "second" may explicitly or implicitly include one or more such features.

Certainly, the above embodiments are merely for describing the technical concepts and features of the present application, enabling a person skilled in the art to know about and accordingly implement content of the present application, and are not intended to limit the scope of protection of the present application. Any modifications made based on the spirit and essence of the main technical solutions of the present application shall fall within the scope of protection of the present application.

What is claimed is:

1. A power supply control method for a power supply unit of a server, wherein the power supply control method comprises:

determining a target sampling point based on a current scenario, and obtaining a sampled voltage at the target sampling point in a power supply link of the power supply unit according to a preset rule, the target sampling point being a sampling point arranged in the power supply unit, or being a sampling point arranged close to an output end of a multi-path redundant circuit of the power supply unit, or being a sampling point arranged at a far-end load of a server motherboard, and the preset rule representing a corresponding relationship between the sampled voltage at the target sampling point and an actual voltage;

obtaining a voltage error of the power supply link through calculation based on the sampled voltage at the target sampling point; and adjusting a voltage of the power supply link of the power supply unit based on the voltage error of the power supply link;

wherein a first differential amplification circuit and a second differential amplification circuit are connected to the power supply link of the power supply unit, the sampling point arranged in the power supply unit is connected to the first differential amplification circuit, and the sampling point arranged close to the output end of the multi-path redundant circuit of the power supply unit and the sampling point arranged at the far-end load of the server motherboard are connected to the second differential amplification circuit; and the determining a target sampling point based on a current scenario, and obtaining a sampled voltage at the target sampling point in a power supply link of the power supply unit according to a preset rule comprises:

determining the target sampling point based on the current scenario, and obtaining a target sampling point voltage; and obtaining a sampled voltage of the first differential amplification circuit or the second differential amplification circuit through calculation according to the preset rule and the target sampling point voltage.

2. The power supply control method for a power supply unit of a server according to claim 1, wherein the current scenario is a scenario in which the power supply unit is powered on normally, and the determining the target sampling point based on the current scenario, and obtaining a target sampling point voltage comprises:

obtaining, based on the scenario in which the power supply unit is powered on normally, a voltage at the sampling point arranged in the power supply unit; and the obtaining a sampled voltage of the first differential amplification circuit or the second differential amplification circuit through calculation according to the preset rule and the target sampling point voltage comprises:

obtaining the sampled voltage of the first differential amplification circuit through calculation according to the preset rule and the voltage at the sampling point arranged in the power supply unit.

3. The power supply control method for a power supply unit of a server according to claim 2, wherein the first differential amplification circuit comprises a first input end, a second input end, and a first output end, wherein the first input end and the second input end are connected to the sampling point arranged in the power supply unit, and the first output end outputs a first linearly amplified signal representing the sampled voltage of the first differential amplification circuit.

4. The power supply control method for a power supply unit of a server according to claim 3, wherein the first differential amplification circuit comprises a first resistor, a second resistor, a third resistor, a fourth resistor, and a first operational amplifier, wherein one end of the first resistor is connected as the first input end of the first differential amplification circuit to a sampling point A arranged in the power supply unit, a second end of the first resistor is connected to an in-phase input end of the first operational amplifier and one end of the second resistor, and a second end of the second resistor is connected to an output end of the first operational amplifier; and one end of the third resistor is connected as the second input end of the first differential amplification circuit to a sampling point B arranged in the power supply unit, a second end of the third resistor is connected to an inverting input end of the first operational amplifier and one end of the fourth resistor, and a second end of the fourth resistor is grounded.

5. The power supply control method for a power supply unit of a server according to claim 4, wherein a resistance of the first resistor is equal to a resistance of the third resistor, and a resistance of the second resistor is equal to a resistance of the fourth resistor.

6. The power supply control method for a power supply unit of a server according to claim 1, wherein the current scenario is a scenario of ensuring stable power supply to a far end, and the determining the target sampling point based on the current scenario, and obtaining a target sampling point voltage comprises:

obtaining, based on the scenario of ensuring stable power supply to the far end, a voltage at the sampling point arranged at the far-end load of the server motherboard; and the obtaining a sampled voltage of the first differential amplification circuit or the second differential amplification circuit through calculation according to the preset rule and the target sampling point voltage comprises:

obtaining the sampled voltage of the second differential amplification circuit through calculation according to the preset rule and the voltage at the sampling point arranged at the far-end load of the server motherboard.

7. The power supply control method for a power supply unit of a server according to claim 6, wherein the current scenario is a scenario in which the power supply unit is powered off, and the determining the target sampling point based on the current scenario, and obtaining a target sampling point voltage comprises:

obtaining, based on the scenario in which the power supply unit is powered off, the voltage at the sampling point arranged in the power supply unit; and the obtaining a sampled voltage of the first differential amplification circuit or the second differential amplification circuit through calculation according to the preset rule and the target sampling point voltage comprises:

obtaining the sampled voltage of the first differential amplification circuit through calculation according to the preset rule and the voltage at the sampling point arranged in the power supply unit.

8. The power supply control method for a power supply unit of a server according to claim 7, wherein the current scenario is a scenario in which a far-end sampling point of a system is abnormal, and the determining the target sampling point based on the current scenario, and obtaining a target sampling point voltage comprises:

obtaining, based on the scenario in which the far-end sampling point of the system is abnormal, a voltage at the sampling arranged close to the output end of the multi-path redundant circuit of the power supply unit; and the obtaining a sampled point voltage of the first differential amplification circuit or the second differential amplification circuit through calculation according to the preset rule and the target sampling point voltage comprises:

obtaining the sampled voltage of the second differential amplification circuit through calculation according to the preset rule and the voltage at the sampling point arranged close to the output end of the multi-path redundant circuit of the power supply unit.

9. The power supply control method for a power supply unit of a server according to claim 8, wherein the second differential amplification circuit comprises a third input end, a fourth input end, a fifth input end, a sixth input end, and a second output end, wherein the third input end and the fourth input end are connected to the sampling point arranged close to the output end of the multi-path redundant circuit of the power supply unit, the fifth input end and the sixth input end are connected to the sampling point arranged at the far-end load of the server motherboard, and the second output end outputs a second linearly amplified signal representing the sampled voltage of the second differential amplification circuit.

10. The power supply control method for a power supply unit of a server according to claim 9, wherein the second differential amplification circuit comprises a fifth resistor, a sixth resistor, a seventh resistor, an eighth resistor, a ninth resistor, a tenth resistor, and a second operational amplifier, wherein one end of the ninth resistor is connected as the third input end of the second differential amplification circuit to a sampling point C arranged close to the output end of the multi-path redundant circuit of the power supply unit, a second end of the ninth resistor is connected to the fifth resistor, one end of the fifth resistor is connected to the second end of the ninth resistor and is connected as the fifth input end of the second differential amplification circuit to a sampling point E arranged at the far-end load of the server motherboard, a second end of the fifth resistor is connected to an in-phase input end of the second operational amplifier and one end of the seventh resistor, and a second end of the seventh resistor is connected to an output end of the second operational amplifier; and one end of the tenth resistor is connected as the fourth input end of the second differential amplification circuit to a sampling point D arranged close to the output end of the multi-path redundant circuit of the power supply unit, a second end of the tenth resistor is connected to the sixth resistor, one end of the sixth resistor is connected to the tenth resistor and is connected as the sixth input end of the second differential amplification circuit to a sampling point F arranged at the far-end load of the server motherboard, a second end of the sixth resistor is connected to an inverting input end of the second operational amplifier and one end of the eighth resistor, and a second end of the eighth resistor is grounded.

11. The power supply control method for a power supply unit of a server according to claim 10, wherein a resistance of the fifth resistor is equal to a resistance of the sixth resistor, a resistance of the ninth resistor is equal to a resistance of the tenth resistor, and a resistance of the seventh resistor is equal to a resistance of the eighth resistor.

12. The power supply control method for a power supply unit of a server according to claim 1, wherein before the obtaining a voltage error of the power supply link through calculation based on the sampled voltage at the target sampling point, the method further comprises:

obtaining a specified value of an output voltage of the power supply unit; and the obtaining a voltage error of the power supply link through calculation based on the sampled voltage at the target sampling point comprises:

calculating a difference between the specified value of the output voltage of the power supply unit and the sampled voltage at the target sampling point, to obtain the voltage error of the power supply link.

13. The power supply control method for a power supply unit of a server according to claim 12, wherein the adjusting a voltage of the power supply link of the power supply unit based on the voltage error of the power supply link comprises:

obtaining a link operating frequency based on the voltage error of the power supply link; and adjusting the voltage of the power supply link of the power supply unit based on the link operating frequency.

14. The power supply control method for a power supply unit of a server according to claim 13, wherein the obtaining a link operating frequency based on the voltage error of the power supply link comprises:

obtaining an output value of a target Pi controller based on the voltage error of the power supply link; and obtaining the link operating frequency based on a mapping relationship between an output value of a Pi controller and the link operating frequency, and the output value of the target Pi controller.

15. The power supply control method for a power supply unit of a server according to claim 1, wherein before the obtaining a sampled voltage at the target sampling point in a power supply link of the power supply unit according to a preset rule, the method further comprises:

detecting, in response to receiving a power supply unit power-on instruction or a power supply unit power-off instruction, whether a power status of the power supply unit is normal; and obtaining a sampled voltage at the target sampling point in a power supply link of the power supply unit according to a preset rule in response to detecting that the power status of the power supply unit is normal.

16. The power supply control method for a power supply unit of a server according to claim 15, wherein before the detecting, in response to receiving a power supply unit power-on instruction, whether a power status of the power supply unit is normal, the method further comprises:

determining whether statuses of the power supply unit and an associated component of the power supply unit satisfy a preset condition; and detecting, in response to determining that the statuses of the power supply unit and the associated component of the power supply unit satisfy the preset condition, whether the power status of the power supply unit is normal.

17. The power supply control method for a power supply unit of a server according to claim 1, wherein the power supply unit is connected to the server motherboard through the multi-path redundant circuit; and the current scenario is a scenario in which the power supply unit is powered on normally or is powered off, and the target sampling point is the sampling point arranged in the power supply unit; the current scenario is a scenario of ensuring stable power supply to a far end, and the target sampling point is the sampling point arranged at the far-end load of the server motherboard; or the current scenario is a scenario in which a far-end sampling end of a system is abnormal, and the target sampling point is the sampling point arranged close to the output end of the multi-path redundant circuit of the power supply unit.

18. A computer device, comprising:

one or more processors; and a memory associated with the one or more processors, wherein the memory is configured to store computer-readable instructions that, when read and executed by the one or more processors, cause the one or more processors to:

determine a target sampling point based on a current scenario, and obtain a sampled voltage at the target sampling point in a power supply link of a power supply unit according to a preset rule, the target sampling point being a sampling point arranged in the power supply unit, or being a sampling point arranged close to an output end of a multi-path redundant circuit of the power supply unit, or being a sampling point arranged at a far-end load of a server motherboard, and the preset rule representing a corresponding relationship between the sampled voltage at the target sampling point and an actual voltage;

obtain a voltage error of the power supply link through calculation based on the sampled voltage at the target sampling point; and adjust a voltage of the power supply link of the power supply unit based on the voltage error of the power supply link;

wherein a first differential amplification circuit and a second differential amplification circuit are connected to the power supply link of the power supply unit, the sampling point arranged in the power supply unit is connected to the first differential amplification circuit, and the sampling point arranged close to the output end of the multi-path redundant circuit of the power supply unit and the sampling point arranged at the far-end load of the server motherboard are connected to the second differential amplification circuit; and the determine a target sampling point based on a current scenario, and obtain a sampled voltage at the target sampling point in a power supply link of a power supply unit according to a preset rule comprises:

determining the target sampling point based on the current scenario, and obtaining a target sampling point voltage; and obtaining a sampled voltage of the first differential amplification circuit or the second differential amplification circuit through calculation according to the preset rule and the target sampling point voltage.

19. A non-transitory computer readable storage medium, storing computer instructions that cause a computer to perform a power supply control method for a power supply unit of a server, comprising:

determining a target sampling point based on a current scenario, and obtaining a sampled voltage at the target sampling point in a power supply link of the power supply unit according to a preset rule, the target sampling point being a sampling point arranged in the power supply unit, or being a sampling point arranged close to an output end of a multi-path redundant circuit of the power supply unit, or being a sampling point arranged at a far-end load of a server motherboard, and the preset rule representing a corresponding relationship between the sampled voltage at the target sampling point and an actual voltage;

obtaining a voltage error of the power supply link through calculation based on the sampled voltage at the target sampling point; and adjusting a voltage of the power supply link of the power supply unit based on the voltage error of the power supply link;

wherein a first differential amplification circuit and a second differential amplification circuit are connected to the power supply link of the power supply unit, the sampling point arranged in the power supply unit is connected to the first differential amplification circuit, and the sampling point arranged close to the output end of the multi-path redundant circuit of the power supply unit and the sampling point arranged at the far-end load of the server motherboard are connected to the second differential amplification circuit; and the determining a target sampling point based on a current scenario, and obtaining a sampled voltage at the target sampling point in a power supply link of the power supply unit according to a preset rule comprises:

determining the target sampling point based on the current scenario, and obtaining a target sampling point voltage; and obtaining a sampled voltage of the first differential amplification circuit or the second differential amplification circuit through calculation according to the preset rule and the target sampling point voltage.

* * * * *